United States Patent [19]

Romaine

[11] Patent Number: 4,967,447
[45] Date of Patent: Nov. 6, 1990

[54] FISH SLICER AND METHOD OF FRYING FISH

[76] Inventor: Jeffrey L. Romaine, 2620 Plainview Terr., Alton, Ill. 62002

[21] Appl. No.: 412,012

[22] Filed: Sep. 25, 1989

[51] Int. Cl.[5] ............................................. A22C 25/16
[52] U.S. Cl. .................................... 452/149; 452/162; 452/135
[58] Field of Search .................. 17/56, 57, 52, 46, 26, 17/61, 48; 83/418, 425, 425.2, 425.3, 433; 30/501

[56] References Cited

U.S. PATENT DOCUMENTS

| | | | |
|---|---|---|---|
| 3,990,336 | 11/1976 | Soodacter | 83/425.3 |
| 3,999,248 | 12/1976 | Mauer et al. | 17/46 |
| 4,041,822 | 8/1987 | Gabel | 83/425.3 |
| 4,236,275 | 12/1980 | Westerdahl | 17/57 |
| 4,507,037 | 3/1985 | Fenimore | 83/426 |
| 4,562,613 | 1/1986 | Lewis | 17/57 |
| 4,726,094 | 2/1988 | Braeger | 17/61 |
| 4,752,988 | 6/1988 | Guglielmo et al. | 17/48 |
| 4,766,791 | 8/1988 | McMillan et al. | 83/425.3 |
| 4,815,167 | 3/1989 | Emanuelsen | 17/58 |
| 4,868,951 | 9/1989 | Akesson et al. | 17/52 |

Primary Examiner—Willis Little
Attorney, Agent, or Firm—Don W. Weber

[57] ABSTRACT

A new device and method for preparing bony fish for safe consumption by human beings is presented. The device comprises an endless belt which transports a fillet underneath a series of closely spaced vertical circular slicer blades. A small distance is maintained between the bottom of the slicer blades and the upper surface of the continuous belt so that the fillet is sliced into very small portions but the fillet is not severed completely. Once the fillet has been thus sliced, it may be fried for a period of time. The frying of the fillet, with the flesh of the fish and the bones sliced into very small portions, disintegrates any remaining bones so that the finished product is completely edible for human beings.

3 Claims, 7 Drawing Sheets

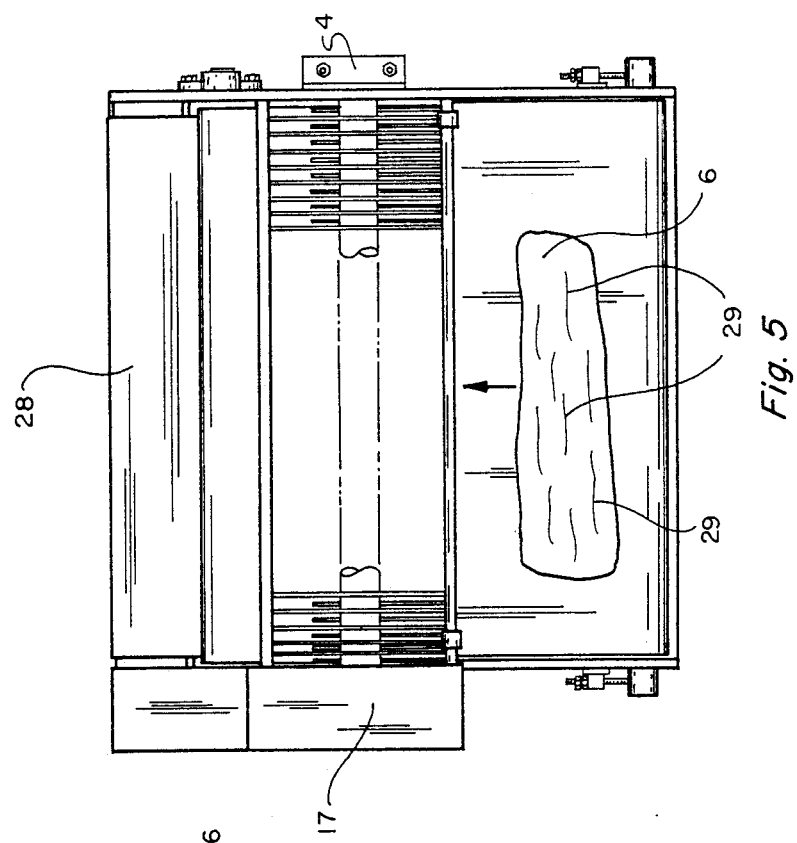
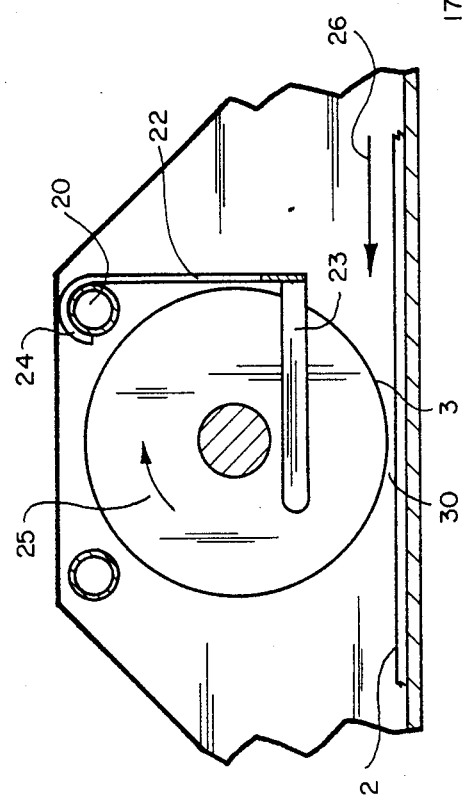
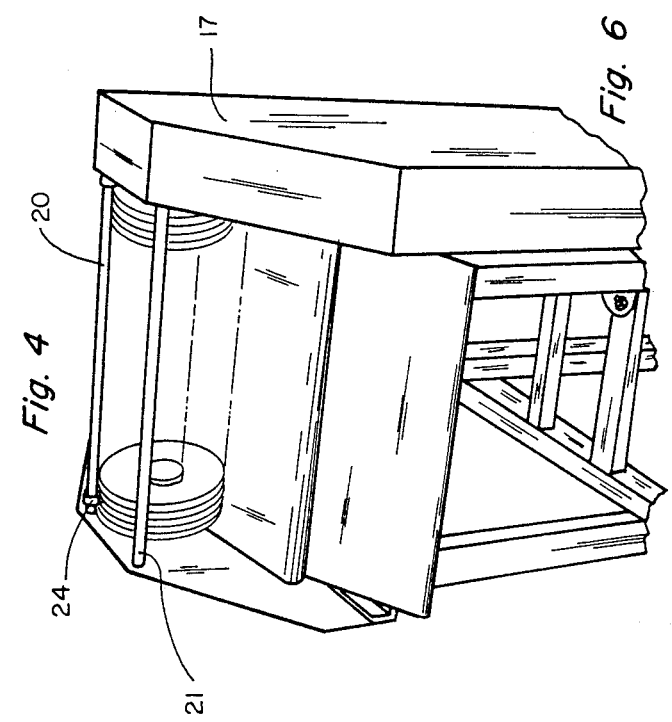

FISH SLICER AND METHOD OF FRYING FISH

BACKGROUND OF THE INVENTION

This invention relates generally to the field of fishing, and more particularly to the field of preparing fish for consumption by humans. The instant invention involves both a machine for preparing fish to be fried and a method of frying the prepared fish.

Consumption of edible fish by human beings has been known for as long as mankind has been on this earth. Many methods have been devised to both catch fish and to prepare them for eating. Fish may be fried, baked, or prepared in a variety of different ways. This particular device relates to a method of frying fish after the fish has been appropriately prepared for such procedure.

A main problem encountered in the consumption of fish is a means to separate the meat of the fish from the bones. Many fish commonly eaten by man are quite bony and the pressence of fish bones in the fillet may often cause dangerous and unhealthy conditions to arise. While a number of inventions directed toward removing the membrane, head, backbone or other particular parts of the fish are known in the art, no device has as yet been produced which effectively deals with the problem of particularly bony fish such as Carp or Buffalo Fish.

Carp and Buffalo Fish are commonly caught throughout the United States, more particularly in the region of the Mississippi River. The Carp or Buffalo Fish have exceptionally bony skeletons and the preparation and consumption of these fish is severely hampered by the hazards encountered due to the number and placement of the fish bones. In normal preparation, these fish are prepared by cutting the meaty sides, referred to as fillets, from the ribs and other skeletal bones. However, a difficulty arises in the preparation of fish due to the large amount of bones, left with the fillet.

This invention relates to a new device which may be conveniently used to sever the remaining bones of the fillet into such small parts that the fillet may then be readily cooked by frying. Once the fish has been sliced into minute portions by means of this new machine, the fish may then be fried. Another object of this invention is to provide a new frying process which disintegrates the minute fish bone parts, thus making the entire fish quite edible, as will as very tasty.

It is a further object of this invention to provide a new machine for preparing exceptionally bony fish for eating. It is yet another object of this invention to provide a completely edible fish which is also safely consumed by humans. It is a still further object of this invention to provide a new device and method for preparing exceptionally bony fish, such as Carp and Buffalo Fish, for safe consumption.

Futher and other objects of this invention will become apparent upon reading the following Specification.

BRIEF DESCRIPTION OF THE INVENTION

This invention comprises a fish slicer which has a number of circular vertical slicing blades which are spaced a small distance apart. Underneath the blades a continuous belt transports the fish towards the vertical slicing blades. The belt is driven in a direction opposite the path of travel of the blades. The blades are adjustable so that the fish, which is fed through the blades laterally, slice the fish almost completely through the vertical cross section. Once the fish has been thus processed, it may be fried, which completely disintegrates the remaining bones of the fish. The fish thus processed and prepared is completely edible and quite safe for human consumption.

BRIEF DESCRIPTION OF THE DRAWINGS

FIG. 4 is a sectioned view of the slicer blades taken along lines 4—4 of FIG. 3.

FIG. 5 is a top view of the invention showing the belt, metal chute, and slicer blades.

FIG. 6 is a rear perspective view of the invention.

DETAILED DESCRIPTION OF THE PREFERRED EMBODIMENT

Figure 1:
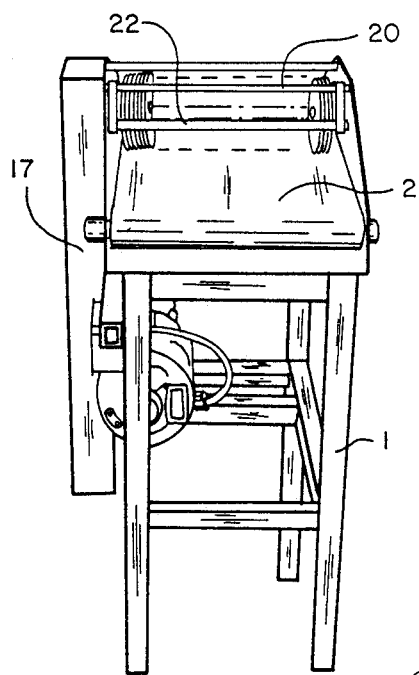
FIG. 1 is a front perspective view of the device.
Figure 2:
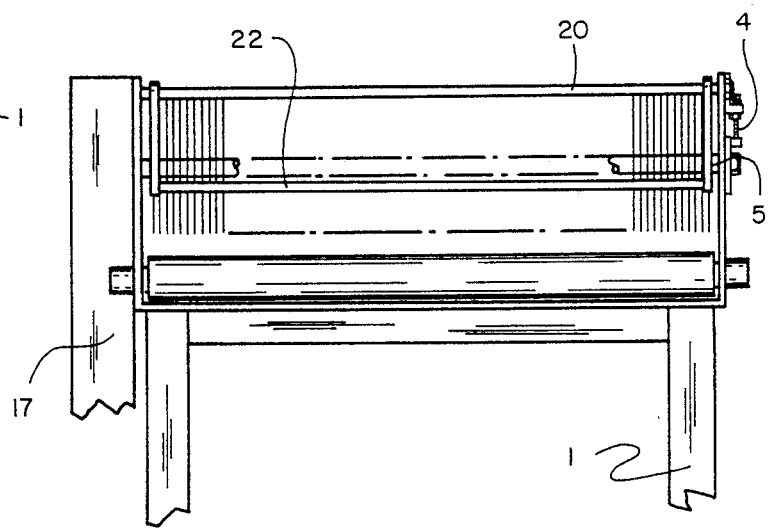
FIG. 2 is a detailed front view of the slicer showing the comb, belt, and slicing blades.
Figure 3:
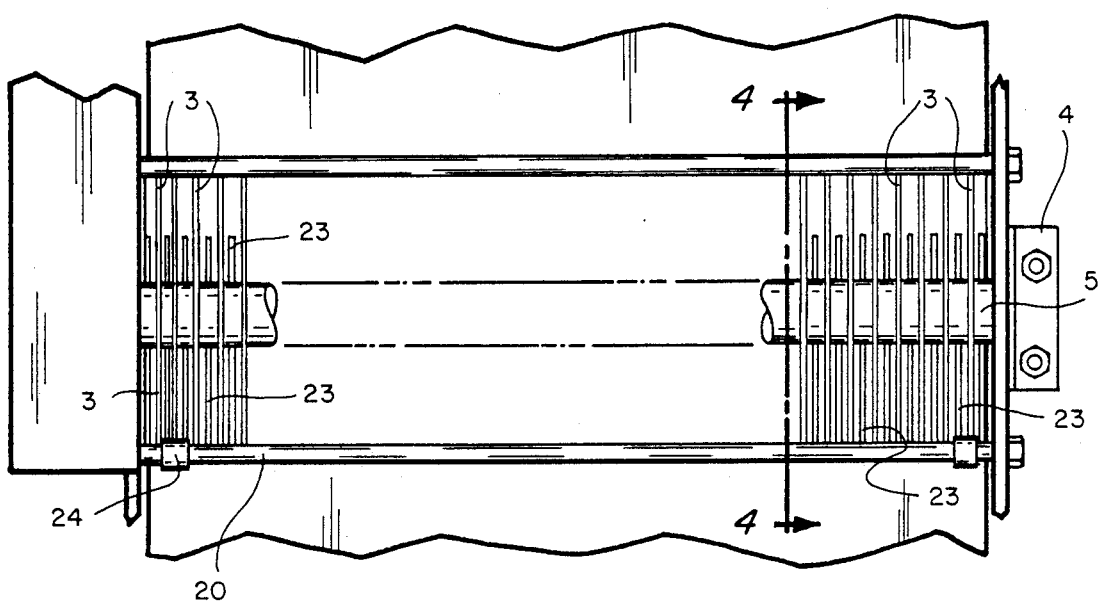
FIG. 3 is a top view of the slicer blades with the comb hanging on the horizontal bar.
Figure 7:
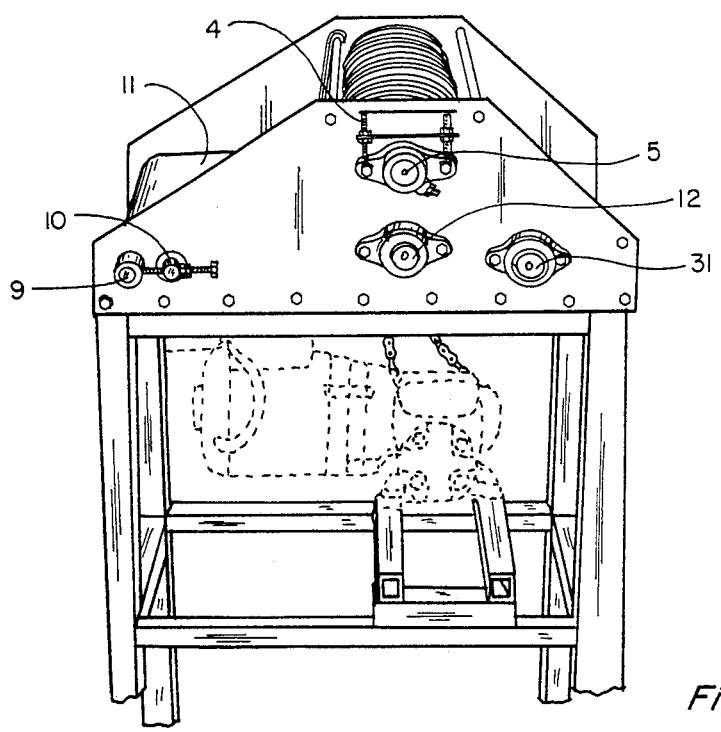
FIG. 7 is a side elevational perspective view of the invention showing the belt and blade adjustments.

The main mechanism of this invention rests on a base stand 1. This stand supports a continuously driven belt 2. As best shown on FIG. 3, the belt passes beneath vertical circular slicer blades 3.

The distance 30 from the bottom of the slicer blades 3 to the upper surface of the belt 2 is adjustable by means of the worm-gear adjustments 4. These worm-gear adjustments 4 adjust the central axis 5 of the circular blades so that the fillet 6 may be sliced leaving only a narrow lower portion of the fillet unsevered. The fillet 6 is placed on the belt 2 so that it is sliced laterally across the remaining bones 29 as best shown on FIG. 5.

The continuous belt 2 is driven by means of a chain-driven sprocket 7. The continuous belt drive sprocket 7 is connected to a cylindrical drive roll 31 which runs longitudinally across the lateral surface of the belt. The belt drive sprocket 7 and belt drive cylinder 31 are stationary. At the far end of the continuous drive belt 2 is a far end block and cylinder 9. This far end block and cylinder 9 is adjustable by means of the worm-gear adjustment 10. The far end block cylinder 9 may be adjusted so that the tension on the continuous belt 2 is maintained. In order to insure that the upper lateral surface 11 of the continuous drive belt 2 is not deflected when the fillet 6 comes into contact with the slicer blades 3, central pillow block and cylinder 12 are permanently placed beneath the central axis 5 of the slicer blades. This central pillow block and cylinder prohibits any deflection of the belt as it drives the fish beneath the blades for the slicing procedure.

Figure 8:
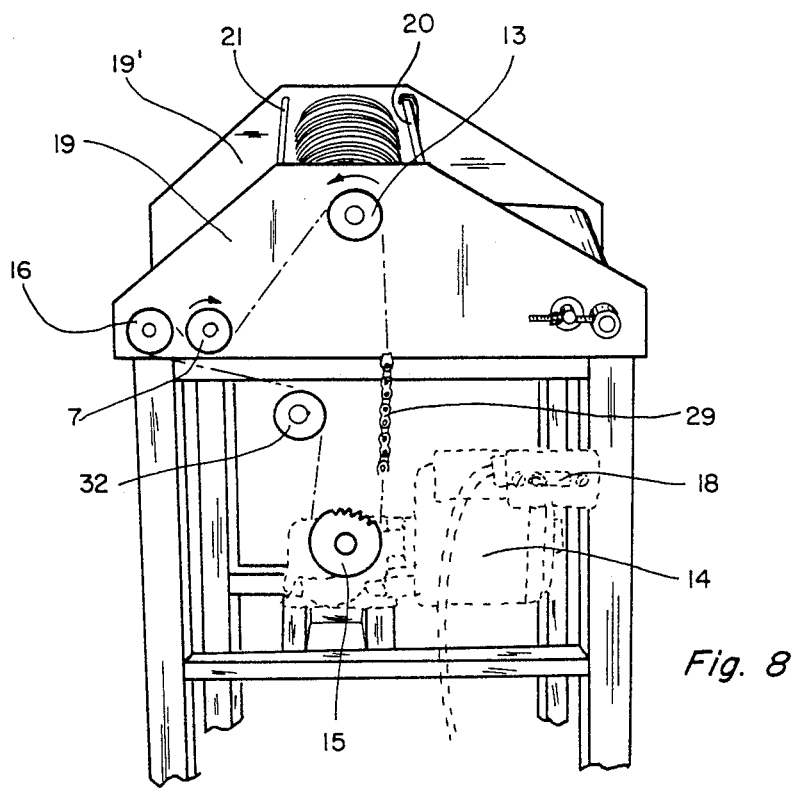
FIG. 8 is a side view of the invention with the sprocket cover removed showing the drive sprockets and chain.

The slicer blades are driven by the blade drive sprocket 13, as best shown on FIG. 8. The entire device is activated by means of a motor 14 which drives a main sprocket 15, as best shown on FIG. 8.

The continuous belt 2 and the slicer blades 3 rotate in opposite directions due to the inverted pathway of the drive chain, as best shown on FIG. 8. The drive chain passes under the continuous belt drive socket 7 and over the reversing sprocket 16. An adjustable tensioning sprocket 32 maintains the tension of the drive chain 29. The sprockets are covered by the sprocket cover 17. An on-off switch 18 controls the motor 14 and hence the operation of the belts and blades.

The blades are bounded by vertical sides 19 and 19'. These vertical sides are separated at the top by a front reinforcing rod 20 and a rear reinforcing rod 21. In order to prohibit the fillet from riding up and around the slicer blades 3 a fillet restraining comb 22 is placed over the front reinforcing rod 20. This comb is hooked over the front reinforcing rod 20 and has a number of lateral comb tines 23 as best shown on FIGS. 3 and 4. The lateral fillet restraining comb 22 hooks around the front reinforcing rod 20 by means of comb hooks 24. When the fillet is placed on the belt and run beneath the slicer blades 3, the lateral comb tines 23 prohibit the fillet from sliding up and around the cylindrical slicer blades. During this process, the fillet is not completely sliced into pieces but a small lower portion of the fillet, equal to the blade/belt distance 30 remains after the slicing procedure. As the fillet passes in the direction of the arrow 26, the blades rotate in the direction of the arrow 25 as best shown in FIG. 4. The fillet is prohibited from moving in the clockwise direction of the rotation of the slicer blades 3 due to the pressence of the lateral comb tines 23. Once the sliced fillet passes underneath the blades 3, it moves onto the metal delivery chute 28.

Once the fillets have been cut from the sides of the fish, the backbone and other skeleton is discarded, along with the fish head and tail. However, the fillets still contain a large number of remaining ancillary bones 29, 30 as best shown on FIG. 5. The use of this device on Carp or Buffalo fillets severs these ancillary bones into minute fragments. The frying process consists of placing the minutely sliced fillet into a deep fat fryer and cooking the fillet, bones and all, for a period of time until the fillet floats in the cooking oil. This frying process disintegrates the bones of the fish and makes the entire fillet, including the fish flesh and bones, completely edible and digestible by a human being.

The slicer blades 3 of the current invention are made of hardened steel in the preferred embodiment and are six inches in diameter. Each belt cylinder is two inches in diameter. In the preferred embodiment, the main drive sprocket 15 is a number 35 drive sprocket. The blade drive sprocket 13 and the belt drive sprocket 7 are number 16 sprockets. The reversing sprocket 16 and the adjustable tensioning sprocket 32 are ideally comprised of number 19 sprockets. The main drive sprocket 15 drives the remaining sprockets 13, 7, 16 and 32 by means of a continuous chain belt 33.

The entire device (except for the continuous belt 2) is ideally made of steel or other suitable metal. The device as described herein may have minor variations and the precise measurements and specifications as given heretofore are meant as means or illustration only and not as a limitation. Because the central slicer blades 3 have a diameter which is three times the diameter of the roller used to drive the belt, the belt moves three times as fast as the central slicer blades. Obviously, this particular relationship may be varied while still remaining within the spirit and conception of the present invention. Other common equivalents may also be used without varying from the essential inventive concept of the current invention.

Having fully described and disclosed my invention, I claim:

1. A fillet slicing machine, comprising:
   (a) a horizontal continuous belt driven in a first direction by a motor means;
   (b) a plurality of vertically adjustable circular slicer blades driven in a second opposite direction by a motor means;
   (c) a means for adjusting the space between the upper surface of said belt and the bottom edge of said slicer blades;
   whereby the remaining bones in a fillet are slicer into small fragments.

2. A fillet slicing machine as in claim 1, further comprising a fillet restraining comb having a plurality of tines positioned between said slicer blades to separate the slicer fillet from said blades.

3. A fillet slicing machine as in claim 1, further comprising a reversing sprocket, whereby the belt and blades may be driven in opposite directions simultaneously by the same motor means.

* * * * *